United States Patent [19]

Toyoda et al.

[11] Patent Number: 4,861,820
[45] Date of Patent: Aug. 29, 1989

[54] ADHESIVE COMPOSITION

[75] Inventors: Yasushi Toyoda; Saburo Mishiba, both of Niihama; Toshiyasu Nishioka, Settsu, all of Japan

[73] Assignee: Sumitomo Naugatuck Co., Ltd., Osaka, Japan

[21] Appl. No.: 89,767

[22] Filed: Aug. 27, 1987

[30] Foreign Application Priority Data

Aug. 28, 1986 [JP] Japan .................. 61-202153

[51] Int. Cl.$^4$ ............................ C08K 3/20
[52] U.S. Cl. ...................... 524/510; 524/501
[58] Field of Search .................. 524/501, 510

[56] References Cited

U.S. PATENT DOCUMENTS

| | | | |
|---|---|---|---|
| 4,157,420 | 6/1979 | Bourrain et al. | 524/501 |
| 4,164,485 | 8/1979 | Girgis | 524/501 |
| 4,314,050 | 2/1982 | Girgis | 524/501 |
| 4,350,723 | 9/1982 | Sugimura et al. | 524/501 |
| 4,355,131 | 10/1982 | Wise | 524/501 |
| 4,405,746 | 9/1983 | Girgis | 524/501 |
| 4,476,191 | 10/1984 | Girgis | 524/501 |
| 4,569,963 | 2/1986 | Hisaki et al. | 524/510 |

FOREIGN PATENT DOCUMENTS 1256705 12/1971 United Kingdom.

*Primary Examiner*—Joseph L. Schofer
*Assistant Examiner*—J. M. Reddick

[57] ABSTRACT

An adhesive composition comprising
(A) 100 parts by weight of a copolymer latex mixture consisting of
  (a1) 50 to 95% by weight (expressed as a solid content) of a butadiene-styrene-vinylpyridine copolymer latex and
  (a2) 5 to 50% by weight (expressed as a solid content) of a carboxylated butadiene-styrene base copolymer latex
and
(B) 10 to 30 parts by weight of a resorcinformalin resin, which adheres fiber to rubber with good initial adhesion strength and/or without deterioration of adhesion strength after thermal history, and has good mechanical stability.

2 Claims, No Drawings

ADHESIVE COMPOSITION

BACKGROUND OF THE INVENTION

1. Field of the Invention

The present invention relates to an adhesive composition for adhering a rubber and fibers. More particularly, it relates to an adhesive composition for adhering the rubber and reinforcing fibers contained in a rubbery product such as a tire, a belt and a hose.

2. Description of the Prior Arts

Conventionally, for adhering the fibers with the rubber, widely used is an adhesive composition (RFL) comprising a butadiene-styrene-vinylpyridine copolymer latex or a mixture of said latex and a butadiene-styrene copolymer latex, and a resorcin-formalin resin (RF resin) (cf. Emulsion Latex Handbook (Taiseisha, Japan), page 188).

As the reinforcing fiber, a polyamide fiber (e.g. Nylon) is widely used. Recently, polyester and aramid fibers are increasingly used as the reinforcing fiber since they have less elongation and better strength and dimensional stability than the polyamide fiber. However, since the polyester fiber has poor heat resistance, its adhesion strength between said fiber and the rubber greatly decreases after thermal history at high temperature, and further its adhesivity with the rubber is inferior to the polyamide fiber so that its initial adhesion strength is low. Therefore, the improvement of these inferior properties is desired.

The polyamide fiber is most widely used as the reinforcing fiber. Although, as described above, it has superior adhesive strength with the rubber to the polyester or aramid fiber, it is still desired to improve its adhesive strength. Although the aramid fiber has good heat resistance, strength and dimensional stability, it has poor adhesivity with the rubber. Thus, improvement of its adhesive strength is required.

The fiber for reinforcing the rubber is treated with the RFL solution, but the RFL solution has poor mechanical stability. When a surfactant is added to the RFL solution in a larger amount to increase the mechanical stability, decrease of the adhesive strength and foaming are enhanced. When a foam inhibitor is added to the RFL solution to prevent foaming, the adhesive strength further decreases. Therefore, improvement of the mechanical stability of the RFL solution is also desired.

SUMMARY OF THE INVENTION

One object of the present invention is to provide an adhesive composition which has improved mechanical stability.

Another object of the present invention is to provide an adhesive composition which can adhere the fiber to the rubber with good adhesive strength which does not decrease even after thermal history.

These and other objects of the present invention are achieved by an adhesive composition, which comprises (A) 100 parts by weight of a copolymer latex mixture consisting of (a1) 50 to 95% by weight (expressed as a solid content) of a butadiene-styrene-vinylpyridine copolymer latex and (a2) 5 to 50% by weight (expressed as a solid content) of a carboxylated butadiene-styrene base copolymer latex and (B) 10 to 30 parts by weight of a resorcinformalin resin.

DETAILED DESCRIPTION OF THE INVENTION

According to the present invention, the copolymer latex (a1) is used in an amount of 50 to 95% by weight based on the total weight of the latexes (a1) and (a2). When the amount of the latex (a1) is outside this range, the adhesive strength of the composition decreases. Correspondingly, the copolymer latex (a2) is used in an amount of 5 to 50% by weight based on the total weight of the latexes (a1) and (a2). When the amount of the latex (a2) is outside this range, the adhesive strength of the composition again decreases.

According to the present invention, the RF resin is used in an amount of 10 to 30 parts by weight per 100 parts of the latex mixture consisting of the latexes (a1) and (a2) in the above ratio. When the amount of the RF resin is less than 10 parts by weight, any effect of the RF resin is not obtained. When the amount of the RF resin is larger than 30 parts by weight, the fiber treated with the adhesive composition becomes too hard. In either case, the adhesive strength decreases.

The copolymer latex (a1) comprises a copolymer of butadiene, styrene and vinylpyridine. To treat the polyamide fiber, the copolymer preferably comprises 60 to 80% by weight of butadiene, 5 to 32% by weight of styrene and 8 to 32% by weight of vinylpyridine and has an average particle size of 70 to 150 nm and a gel content of not more than 70% by weight, since the initial adhesive strength is improved. When the copolymer of the latex (a1) comprises 35 to 65% by weight of butadiene, 8 to 57% by weight of styrene and 8 to 32% by weight of vinylpyridine and has an average particle size of 70 to 150 nm, a gel content of not more than 90% by weight and Mooney viscosity of 30 to 200, the deterioration of the adhesive strength after thermal history is prevented in the case of treating the polyester fiber, and the initial adhesive strength is improved in the case of treating the aramid fiber. More preferably, the copolymer of the latex (a1) comprises 40 to 55% by weight of butadiene, 25 to 52% by weight of styrene and 8 to 20% by weight of vinylpyridine and has a Mooney viscosity of 50 to 130.

The copolymer of the latex (a2) comprises a copolymer of butadiene, styrene, an ethylenically unsaturated carboxylic acid as a modifier and optionally at least one other comonomer copolymerizable with them. To treat the polyamide fiber the copolymer preferably comprises 1 to 20% by weight of the ethylenically unsaturated carboxylic acid, 40 to 60% by weight of butadiene, 23 to 59% by weight of styrene and 0 to 20% by weight of other copolymerizable comonomer and has an average particle size of 70 to 300 nm and a gel content of 30 to 90% by weight so as to increase the initial adhesive strength. When the copolymer of the latex (a2) comprises 1 to 20% by weight of the ethylenically unsaturated carboxylic acid, 25 to 50% by weight of butadiene, 30 to 74% by weight of styrene and 0 to 20% by weight of other copolymerizable comonomer and has an average particle size of 70 to 300 nm and a gel content of not larger than 70% by weight, the initial adhesive strength is improved and the deterioration of the adhesive strength after thermal history is prevented in the case of treating the polyester fiber, and the initial adhesive strength is improved in the case of treating the aramid fiber.

Examples of the ethylenically unsaturated carboxylic acid are acrylic acid, methacrylic acid, itaconic acid, fumaric acid, maleic acid and the like. They may be used individually or as a mixture thereof.

Examples of other copolymerizable comonomer are alkyl or hydroxyalkyl esters of the ethylenically unsaturated carboxylic acid and acrylamide. As the alkyl ester of the ethylenically unsaturated carboxylic acid, exemplified are methyl methacrylate, ethyl acrylate, butyl acrylate and the like. As the hydroxyalkyl ester of the ethylenically unsaturated carboxylic acid, exemplified are $\beta$-hydroxyethyl acrylate, $\beta$-hydroxyethyl methacrylate and the like.

Preferably, the copolymer latex (a2) is prepared by polymerizing the monomers under an acidic condition and then adjusting the pH of the reaction mixture in a range between 8 and 12, and thereafter it is mixed with the copolymer latex (a1).

The copolymer latexes (a1) and (a2) are prepared by per se conventional methods, for example, a batch wise method, a partial addition method, a continuous addition method, a two-stage polymerization method and a power feed method.

The adhesive composition of the present invention can be used for adhering any fiber to the rubber. Examples of the fiber are polyamide fiber, namely Nylon fiber, polyester fiber, aramid fiber and the like.

The adhesive composition of the present invention may optionally contain isocyanate, blocked isocyanate, ethyleneurea, polyepoxide, modified polyvinyl chloride and the like.

PREFERRED EMBODIMENT OF THE INVENTION

The present invention will be illustrated by following Examples, which do not limit the present invention. In Examples, "parts" and "%" are by weight unless otherwise indicated.

EXAMPLE 1

Preparation of Copolymer Latex (a1)

To an autoclave equipped with a stirrer, water (130 parts), potassium rhodate (4 parts), sodium naphthalenesulfonate/formalin condensate (1 part) and sodium hydroxide (0.5 part) were charged and dissolved. To the resulting solution, a monomer mixture having a composition shown in Table 1 (100 parts) and tert.-dodecylmercaptan (0.5 part were added.

Then, potassium persulfate (0.5 part) was added to initiate polymerization, which was continued by keeping the temperature of the reaction system at 50° C. When a polymerization conversion reached 92%, hydroquinone (0.5 part) was added to stop polymerization. The unreacted monomers were distilled off under reduced pressure from the reaction mixture to obtain a copolymer latex (A to D in Table 1).

For preparing a comparative copolymer latex, a monomer mixture having a composition E in Table 1 was polymerized according to the following procedure.

To an autoclave equipped with a stirrer, water (150 parts), polyoxyethylene lauryl ether (5 parts), sodium ethylenediaminetetraacetate (0.005 part), tert.-dodecylmercaptan (0.5 part) and potassium persulfate (0.3 part) and then a monomer mixture having a composition E in Table 1 (100 parts) were added and the polymerization was carried out at 50° C. When the polymerization conversion reached 50%, tert.-dodecylmercaptan (0.5 part) was further added. Thereafter, when the polymerization conversion reached 95%, hydroquinone (0.05 part) was added to stop polymerization. The unreacted monomers were distilled off under reduced pressure from the reaction mixture to obtain a copolymer latex (E in Table 1).

TABLE 1

| Latex No. | Butadiene (%) | Styrene (%) | 2-Vinylpyridine (%) | Methacrylic acid (%) |
|---|---|---|---|---|
| A | 65 | 5 | 30 | — |
| B | 70 | 15 | 15 | — |
| C | 70 | 10 | 20 | — |
| D | 75 | 5 | 20 | — |
| E | 70 | 9 | 15 | 6 |

Preparation of Copolymer Latex (a2)

To an autoclave equipped with a stirrer, water (100 parts) and sodium dodecylsulfate (2 parts) were charged and dissolved. To the resulting solution, a monomer mixture having a composition shown in Table 2 (100 parts) and tert.-dodecylmercaptan (0.3 part) were added. Then, potassium persulfate (0.5 part) was added to initiate polymerization, which was carried out at 50° C. When the polymerization conversion reached 97%, the polymerization was stopped. pH of the resulting latex was adjusted to 6 with an aqueous solution of sodium hydroxide. Thereafter, the reaction mixture was distilled under reduced pressure to remove the unreacted monomers to obtain a copolymer latex (F to I in Table 2).

A comparative copolymer latex was prepared in the same procedure as in the above but changing the composition of the monomer mixture shown in Table 2 (J).

TABLE 2

| Latex No. | Butadiene (%) | Styrene (%) | Methacrylic acid (%) | Acrylic acid (%) | Itaconic acid (%) | Methyl methacrylate (%) |
|---|---|---|---|---|---|---|
| F | 45 | 40 | 15 | — | — | — |
| G | 55 | 37 | — | — | 8 | — |
| H | 50 | 39 | 5 | 6 | — | — |
| I | 50 | 37 | 3 | — | — | 10 |
| J | 55 | 45 | — | — | — | — |

Preparation of RFL Solution

After adjusting pH of each of the copolymer latexes F through J to 10 with an aqueous solution of sodium hydroxide, it was mixed with one of the copolymer latexes A through E in a ratio shown in Table 4.

Separately, to water (333.5 parts), sodium hydroxide (1.3 parts), resorcin (16.6 parts) and 37% formalin (14.6 parts) were added and aged at 25° C. for 2 hours to obtain an RF resin.

To the copolymer latex mixture (100 parts), the resulting RF resin was added in an amount shown in Table 4 and aged at 25° C. for 20 hours. Then, Vulcanbond E (a trade name of ICI Vulnax) (25 parts) was added and its solid content was adjusted to 15% with water to obtain an RFL solution (No. 1 to 17 in Table 4).

Tire cord Dip Treatment and Measurement of Adhesive Strength

By means of a laboratory single cord dipping machine, a polyester tire cord (1500D/2) was dipped in each of the RFL solutions 1 through 17. The treated tire cord was sandwiched between a pair of sheets of a rubbery composition having a formulation shown in Table 3 and press cured at 140° C. or 170° C. for 30 minutes. According to the procedures of ASTM D 2138-67 (H Pull Test), the adhesive strength was measured to evaluate decrease of the adhesive strength due to thermal history at high temperatures. The results are shown in Table 4.

TABLE 3

| Rubber formulation | Parts |
| --- | --- |
| Natural rubber | 100 |
| SRF carbon | 20 |
| REF carbon | 20 |
| Paintal | 5 |
| Styrenated phenol | 2 |
| Stearic acid | 2.5 |
| Zinc white | 5 |
| Vulcanization accelerator (N—Cyclohexyl-2-benzothiazylsulfenamide) | 1 |
| Sulfur | 3 |

Tire Cord Dip Treatment and Measurement of Adhesive Strength

By means of a laboratory single cord dipping machine, a Nylon tire cord (1890D/2) was dipped in each of the RFL solutions 21 through 27. The treated tire cord was sandwiched between a pair of sheets of the rubbery composition having the formulation shown in Table 3 and press cured at 145° C. for 30 minutes. According to the procedures of ASTM D 2138-67 (H Pull Test), the initial adhesive strength was measured. The results are shown in Table 5.

Mechanical Stability of RFL Solution

To evaluate the mechanical stability of the RFL solutions 21 through 27, 50 g of each RFL solution was charged to a Malon type mechanical stability testing device. The measurement was carried out under load of 10 kg for 10 minutes of rotation time. The dry weight of generated coagulate was measured and converted to percentage per solid weight in the RFL solution. The results are shown in Table 5.

TABLE 4

| | RFL No. | Latex (a1) (parts, solid cont.) | Latex (a2) (parts, solid cont.) | Latex mixture (parts) | RF resin in RFL (parts) | Adhesive strength with polyester fiber (kg/9 mm) Cure condition | |
| --- | --- | --- | --- | --- | --- | --- | --- |
| | | | | | | *1 | *2 |
| Examples | 1 | A (70) | F (30) | 100 | 23.3 | 16.7 | 11.1 |
| | 2 | B (55) | G (45) | 100 | 23.3 | 15.8 | 10.5 |
| | 3 | B (70) | G (30) | 100 | 23.3 | 16.1 | 10.7 |
| | 4 | B (90) | G (10) | 100 | 23.3 | 17.2 | 11.3 |
| | 5 | C (70) | H (30) | 100 | 23.3 | 16.3 | 11.4 |
| | 6 | D (55) | G (45) | 100 | 23.3 | 15.9 | 11.2 |
| | 7 | D (70) | F (30) | 100 | 23.3 | 16.0 | 11.5 |
| | 8 | D (90) | I (10) | 100 | 23.3 | 16.2 | 11.2 |
| Comparative Examples | 9 | B (97) | G (3) | 100 | 23.3 | 14.9 | 9.0 |
| | 10 | A (45) | F (55) | 100 | 23.3 | 15.1 | 9.8 |
| | 11 | B (45) | G (55) | 100 | 23.3 | 14.8 | 9.1 |
| | 12 | B (70) | G (30) | 100 | 8.0 | 13.6 | 8.6 |
| | 13 | B (70) | G (30) | 100 | 35.0 | 14.3 | 9.1 |
| | 14 | E (100) | — | 100 | 23.3 | 14.1 | 7.6 |
| | 15 | B (100) | — | 100 | 23.3 | 14.0 | 7.3 |
| | 16 | B (70) | J (30) | 100 | 23.3 | 13.6 | 6.9 |
| | 17 | E (70) | J (30) | 100 | 23.3 | 14.2 | 7.8 |

Note:
*1 140° C. × 30 minutes.
*2 170° C. × 30 minutes.

EXAMPLE 2

Preparation of RFL Solution

After adjusting the pH of the copolymer latex G or J to 10 with an aqueous solution of sodium hydroxide, it was mixed with the copolymer latex B or E in a ratio as shown in Table 5.

Separately, to water (239 parts), sodium hydroxide (0.3 parts), resorcin (11 parts) and 37% formalin (16.2 parts) were added and aged at 25° C. for 6 hours to obtain an RF resin.

To the copolymer latex mixture (100 parts), all the resulting RF resin was added and aged at 25° C. for 18 hours. Then, its solid content was adjusted to 20% with water to obtain an RFL solution (No. 21 to 27 in Table 5).

TABLE 5

| | RFL No. | Latex (a1) | | Latex (a2) | | Initial adhesion strength with Nylon fiber (kg/9 mm) | Mechanical stability (% of coagulate) |
| --- | --- | --- | --- | --- | --- | --- | --- |
| | | B | E | G | J | | |
| Examples | 21 | 55 | — | 45 | — | 20.3 | 0.074 |
| | 22 | 70 | — | 30 | — | 20.5 | 0.432 |
| | 23 | 90 | — | 10 | — | 20.2 | 0.801 |
| Comp. Examples | 24 | — | 100 | — | — | 18.9 | 1.535 |
| | 25 | 100 | — | — | — | 18.3 | 0.986 |
| | 26 | 70 | — | — | 30 | 17.9 | 1.243 |
| | 27 | — | 70 | — | 30 | 18.8 | 1.674 |

Note:
The parts of the latex is expressed as an amount of the solid in the latex.

EXAMPLE 3

Preparation of RFL Solution

After adjusting the pH of each of the copolymer latexes F through J to 10 with an aqueous solution of sodium hydroxide, it was mixed with the copolymer latex B or E in a ratio as shown in Table 6.

Separately, to water (239 parts), sodium hydroxide (0.3 parts), resorcin (11 parts) and 37% formalin (16.2 parts) were added and aged at 25° C. for 6 hours to obtain an RF resin.

To the copolymer latex mixture (100 parts), all the resulting RF resin was added and aged at 25° C. for 18 hours. Then, its solid content was adjusted to 20% with water to obtain an RFL Solution (No. 31 to 44 in Table 6).

Tire Cord Dip Treatment and Measurement of Adhesive Strength

A pre-treatment liquid was prepared by adding NER010A (Manufacture by Nagase Industries) (2.22 parts), a 10% aqueous solution of sodium carbonate (0.37 part) and Aerosol OT (a 5% aqueous solution manufactured by Nippon Aerosil) (0.56 part) to water (96.85 parts).

By means of a laboratory single cord dipping machine, an aramid tire cord (1500D/2, "Kevlar" manufactured by DuPont) was dipped in the pre-treatment liquid and aged at 240° C. for one minute. Then, pretreated tire cord was dipped in each of the RFL solutions 31 through 44, dried at 130° C. for 2 minutes and heated at 240° C. for one minute. Thereafter, the treated tire cord was sandwiched between a pair of sheets of the rubbery composition having the formulation shown in Table 3 and press cured at 140° C. for 30 minutes. According to the procedures of ASTM D 2138-67 (H Pull Test), the initial adhesive strength was measured. The results are shown in Table 6.

TABLE 6

|  | RFL No. | Latex (a1) (parts) | Latex (a2) (parts) | Initial adhesive strength with aramid fiber (kg/9 mm) |
|---|---|---|---|---|
| Examples | 31 | A (70) | F (30) | 15.7 |
| | 32 | B (55) | G (45) | 15.0 |
| | 33 | B (70) | G (30) | 15.3 |
| | 34 | B (90) | G (10) | 15.5 |
| | 35 | C (70) | H (30) | 15.4 |
| | 36 | D (55) | G (45) | 15.3 |
| | 37 | D (70) | F (30) | 16.0 |
| | 38 | D (90) | I (10) | 15.7 |
| Comparative Examples | 39 | B (97) | G (3) | 14.3 |
| | 40 | B (45) | G (55) | 14.2 |
| | 41 | E (100) | — | 14.1 |
| | 42 | B (100) | — | 14.0 |
| | 43 | B (70) | J (30) | 13.5 |
| | 44 | E (70) | J (30) | 13.8 |

EXAMPLE 4

Preparation of Copolymer Latex (a1)

In the same manner as in Example 1 but using a monomer mixture having a composition shown in Table 7 and changing the amount of tert.-dodecylmercaptan to 0.2 part, a copolymer latex K or L was prepared.

TABLE 7

| Monomer (%) | Latex K | Latex L |
|---|---|---|
| Butadiene | 40 | 50 |
| Styrene | 40 | 35 |
| 2-Vinylpyridine | 20 | 15 |

Preparation of Copolymer Latex (a2)

In the same manner as in Example 1 but using a monomer mixture having a composition shown in Table 8, copolymer latexes M through P were prepared. Among them, the latexes O and P were comparative ones.

TABLE 8

| Monomer (%) | Latex M | Latex N | Latex O | Latex P |
|---|---|---|---|---|
| Butadiene | 30 | 40 | 30 | 40 |
| Styrene | 54 | 55 | 55 | 60 |
| Methacrylic acid | 3 | — | — | — |
| Acrylic acid | 3 | — | — | — |
| Itaconic acid | — | 5 | — | — |
| Methyl methacrylate | 10 | — | 15 | — |

Preparation of RFL Solution

After adjusting the pH of each of the copolymer latexes M through P to 10 with an aqueous solution of sodium hydroxide, it was mixed with the copolymer latex K or L in a ratio shown in Table 10.

Separately, to water (333.5 parts), sodium hydroxide (1.3 parts), resorcin (16.6 parts) and 37% formalin (14.6 parts) were added and aged at 25° C. for 2 hours to obtain an RF resin.

To the copolymer latex mixture (100 parts), all the resulting RF resin (23.3 parts expressed as the solid content) was added and aged at 25° C. for 20 hours. Then, Vulcabond E (25 parts) was added and the solid content was adjusted to 15% with water to obtain an RFL solution (No. 51 to 54 in Table 10).

Tire Cord Dip Treatment and Measurement of Adhesive Strength

By means of a laboratory single cord dipping machine, a polyester tire cord (1500D/2) was dipped in each of the RFL solutions 51 through 54. The treated tire cord was sandwiched between a pair of sheets of a rubbery composition having a formulation as shown in Table 9 and press cured at 140° C. or 170° C. for 30 minutes. According to the procedures of ASTM D 2138-67 (H Pull Test), the adhesive strength was measured to evaluate decrease of the adhesive strength due to thermal history at high temperature. The results are shown in Table 10.

TABLE 9

| Rubber formulation | Parts |
|---|---|
| Natural rubber | 40 |
| SBR #1502 | 60 |
| SRF carbon | 20 |
| REF carbon | 20 |
| Paintal | 5 |
| Styrenated phenol | 2 |
| Stearic acid | 2.5 |
| Zinc white | 5 |
| Vulcanization accelerator (2,2'-Dithio-bis-benzothiazole) | 1.2 |
| Sulfur | 2.4 |

TABLE 10

| | RFL No. | Copolymer latex (a1) (parts, solid cont.) | | Copolymer latex (a2) (parts, solid cont.) | | | | Adhesive strength with polyester fiber (kg/9 mm) Cure condition | |
|---|---|---|---|---|---|---|---|---|---|
| | | K | L | M | N | O | P | *1 | *2 |
| Examples | 51 | 70 | — | — | 30 | — | — | 17.8 | 14.5 |
| | 52 | — | 70 | 30 | — | — | — | 18.1 | 12.9 |
| Comp. Examples | 53 | 70 | — | — | — | 30 | — | 15.0 | 9.8 |
| | 54 | — | 70 | — | — | — | 30 | 15.2 | 9.6 |

TABLE 10-continued

| RFL No. | Copolymer latex (a1) (parts, solid cont.) | | Copolymer latex (a2) (parts, solid cont.) | | | | Adhesive strength with polyester fiber (kg/9 mm) Cure condition | |
|---|---|---|---|---|---|---|---|---|
| | K | L | M | N | O | P | *1 | *2 |
| ples | | | | | | | | |

Note:
*1 140° C. × 30 minutes.
*2 170° C. × 30 minutes.

EXAMPLE 5

Preparation of RFL Solution

After adjusting the pH of the copolymer latex M through P to 10 with an aqueous solution of sodium hydroxide, it was mixed with the copolymer latex K or L in a ratio shown in Table 11.

Separately, to water (239 parts), sodium hydroxide (0.3 parts), resorcin (11 parts) and 37% formalin (16.2 parts) were added and aged at 25° C. for 6 hours to obtain an RF resin.

To the copolymer latex mixture (100 parts), all the resulting RF resin was added and aged at 25° C. for 18 hours. Then, its solid content was adjusted to 20% with water to obtain an RFL solution (No. 61 to 64 in Table 11).

Tire Code Dip Treatment and Measurement of Adhesive Strength

A pre-treatment liquid was prepared by adding NER-010A (2.22 parts), a 10% aqueous solution of sodium carbonate (0.37 part) and Aerosol OT (a 5% solution, manufactured by Nippon Aerosil) (0.56 part) to water (96.85 parts).

By means of a laboratory single cord dipping machine, the aramid fiber (1500D/2, Kevlar manufactured by DuPont) was dipped the pre-treatment liquid and aged at 240° C. for one minute.

Thereafter, the pre-treated fiber was dipped in each of the RFL solutions 61 through 64 and heated at 130° C. for 2 minutes. The treated fiber was sandwiched between a pair of sheets of the rubbery composition having the formulation shown in Table 9 and press cured at 140° C. for 30 minutes. According to the procedures of ASTM D 2138-67 (H Pull Test), the initial adhesive strength was measured. The results are shown in Table 11.

TABLE 11

| | RFL No. | Copolymer latex (a1) (parts, solid cont.) | | Copolymer latex (a2) (parts, solid cont.) | | | | Adhesive strength with aramid fiber (kg/9 mm) |
|---|---|---|---|---|---|---|---|---|
| | | K | L | M | N | O | P | |
| Examples | 61 | 70 | — | 30 | — | — | — | 17.1 |
| | 62 | — | 70 | — | 30 | — | — | 16.9 |
| Comp. | 63 | 70 | — | — | — | — | 30 | 13.9 |
| Examples | 64 | — | 70 | — | — | 30 | — | 14.2 |

As understood from the above description, the adhesive composition according to the present invention can prevent the decrease of the adhesive strength between the polyester fibers and the rubber after thermal history, and increases the initial adhesive strength between the polyamide or aramid fibers and the rubber.

In addition, the adhesive composition according to the present invention has improved mechanical stability and processability.

What is claimed is:

1. An adhesive composition for adhering polyester fiber or aramid fiber to a rubber comprising
   (A) 100 parts by weight of a copolymer latex mixture comprising of
   (a1) 50 to 95% by weight (expressed as a solid content) of a latex of a butadiene-styrene-vinylpyridine copolymer comprising 35 to 65% by weight of butadiene, 8 to 57% by weight of styrene and 8 to 32% by weight of vinylpyridine and having an average particle size of 70 to 150 nm and a gel content of not more than 90% by weight and
   (a2) 5 to 50% by weight (expressed as a solid content) of a latex of a carboxylated butadiene-styrene base copolymer comprising 1 to 20% by weight of a ethylenically unsaturated carboxylic acid, 25 to 50% by weight of butadiene, 30 to 74% by weight of styrene and 0 to 20% by weight of at least one copolymerizable comonomer selected from the group consisting of alkyl and hydroxyalkyl esters of ethylenically unsaturated carboxylic acid and acryl amide and having an average particle size of 70 to 300 nm and a gel content of not more than 70% by weight and
   (B) 10 to 30 parts by weight of a resorcin-formalin resin.

2. The composition of claim 1 wherein for (a2), the ethylenically unsaturated carboxylic acid is selected from the group consisting of acrylic acid, methacrylic acid and itaconic acid and the copolymerizable comonomer is methyl methacrylate.

* * * * *